US009258605B2

(12) United States Patent
Leung et al.

(10) Patent No.: US 9,258,605 B2
(45) Date of Patent: Feb. 9, 2016

(54) SYSTEM AND METHOD FOR TRANSRATING BASED ON MULTIMEDIA PROGRAM TYPE

(75) Inventors: Lewis Leung, Richmond Hill (CA); Indra Laksono, Richmond Hill (CA)

(73) Assignee: ViXS Systems Inc., Toronto (CA)

( * ) Notice: Subject to any disclaimer, the term of this patent is extended or adjusted under 35 U.S.C. 154(b) by 2898 days.

(21) Appl. No.: 11/522,141

(22) Filed: Sep. 15, 2006

(65) Prior Publication Data

US 2007/0073904 A1 Mar. 29, 2007

Related U.S. Application Data

(63) Continuation-in-part of application No. 11/237,435, filed on Sep. 28, 2005, now Pat. No. 7,707,485.

(51) Int. Cl.
*G06F 15/16* (2006.01)
*H04N 21/44* (2011.01)
*H04N 21/434* (2011.01)
(Continued)

(52) U.S. Cl.
CPC ..... *H04N 21/44008* (2013.01); *H04N 21/4345* (2013.01); *H04N 21/4402* (2013.01); *H04N 21/440254* (2013.01); *H04N 21/440263* (2013.01); *H04N 21/4621* (2013.01)

(58) Field of Classification Search
CPC .................. H04N 21/234336; H04N 21/4621
USPC ......................................................... 709/246
See application file for complete search history.

(56) References Cited

U.S. PATENT DOCUMENTS

| 5,969,755 A | 10/1999 | Courtney |
| 6,192,075 B1 * | 2/2001 | Jeng et al. ..................... 375/240 |
| 6,285,818 B1 | 9/2001 | Suito et al. |

(Continued)

FOREIGN PATENT DOCUMENTS

| EP | 1274238 A | 1/2003 |
| GB | 2396050 A | 6/2004 |

OTHER PUBLICATIONS

Wen-Nung Lie et al.: "Combining Caption and Visual Features for Semantic Event Classification of Baseball Video" Multimedia and Expo, 2005. ICME 2005. IEE International Conference on Amsterdam, The Netherlands 06-06, Piscataway, NJ, USA, IEEE, Jul. 6, 2005, pp. 1254-1257, XP010843893, ISBN: 0-7803-0331-7 *the whole document*.

(Continued)

*Primary Examiner* — Esther B Henderson (57) ABSTRACT

A multimedia program type of a received multimedia data is determined. Based on the determined multimedia program type, a peak bit rate limit and/or an average bit rate limit are determined. In instances where a transrated version of the multimedia data is to be stored, a remaining storage capacity of a storage device is determined and the peak bit rate limit and/or the average bit rate limit can be adjusted based on the remaining storage capacity. The multimedia data then is transrated to generate transrated multimedia data that has a peak bit rate that does not exceed the selected peak bit rate limit and/or having an average bit rate that does not exceed the selected average bit rate limit. The transrating of the multimedia additionally can include the application of rule sets based on content characteristics. After transrating, the multimedia data can be transmitted via a network to a destination multimedia device, stored locally for subsequent use, or a combination thereof.

21 Claims, 4 Drawing Sheets

(51) Int. Cl.
*H04N 21/4402* (2011.01)
*H04N 21/462* (2011.01)

(56) References Cited

U.S. PATENT DOCUMENTS

| | | | |
|---|---|---|---|
| 6,744,729 B2 | 6/2004 | Tinsley et al. | |
| 6,760,916 B2 | 7/2004 | Holtz et al. | |
| 6,874,160 B1 | 3/2005 | Herz | |
| 7,075,990 B2* | 7/2006 | Costa | 375/240.24 |
| 7,080,392 B1 | 7/2006 | Geshwind | |
| 7,143,353 B2 | 11/2006 | McGee et al. | |
| 7,209,647 B2* | 4/2007 | Bruls | 386/294 |
| 7,232,948 B2 | 6/2007 | Zhang | |
| 7,284,202 B1 | 10/2007 | Zenith | |
| 7,359,615 B2* | 4/2008 | Miyagoshi et al. | 386/46 |
| 2002/0009289 A1 | 1/2002 | Morishita et al. | |
| 2002/0073424 A1 | 6/2002 | Ward et al. | |
| 2002/0176702 A1 | 11/2002 | Frantz | |
| 2003/0120831 A1 | 6/2003 | Dubil et al. | |
| 2003/0123841 A1 | 7/2003 | Jeannin | |
| 2003/0149559 A1 | 8/2003 | Lopez-Estrada | |
| 2003/0182620 A1 | 9/2003 | Errico et al. | |
| 2003/0202773 A1 | 10/2003 | Dow et al. | |
| 2003/0210889 A1 | 11/2003 | Engle et al. | |
| 2003/0229900 A1 | 12/2003 | Reisman | |
| 2004/0010806 A1 | 1/2004 | Yuen et al. | |
| 2004/0024790 A1 | 2/2004 | Everett | |
| 2004/0109094 A1 | 6/2004 | Lindsay et al. | |
| 2004/0125877 A1 | 7/2004 | Chang et al. | |
| 2004/0187159 A1 | 9/2004 | Gaydos et al. | |
| 2005/0022252 A1 | 1/2005 | Shen | |
| 2005/0041689 A1* | 2/2005 | Wu et al. | 370/477 |
| 2005/0108643 A1 | 5/2005 | Schybergson et al. | |
| 2005/0123001 A1 | 6/2005 | Craven et al. | |
| 2005/0190794 A1* | 9/2005 | Krause et al. | 370/485 |
| 2005/0265395 A1 | 12/2005 | Kim et al. | |
| 2005/0276567 A1 | 12/2005 | Okuyama et al. | |
| 2006/0015904 A1 | 1/2006 | Marcus | |
| 2006/0026294 A1* | 2/2006 | Virdi et al. | 709/232 |
| 2006/0080591 A1 | 4/2006 | Huang et al. | |
| 2006/0153522 A1 | 7/2006 | Iggulden | |
| 2006/0238656 A1 | 10/2006 | Chen et al. | |
| 2007/0279494 A1 | 12/2007 | Aman et al. | |
| 2008/0162623 A1 | 7/2008 | Flynn et al. | |
| 2009/0046873 A1 | 2/2009 | Riedl | |
| 2009/0238264 A1* | 9/2009 | Wittig et al. | 375/240.03 |

OTHER PUBLICATIONS

European Patent Office Search Report, Jun. 22, 2007, 6 pages.
European Patent Office Exam Report, Feb. 19, 2008, 6 pages.
Drucker, Steven M. et al., "SmartSkip: Consumer Level Browsing and Skipping of Digital Video Content," CHI '02; Proceedings of the SIGCHI Conference on Human Factors in Computing Systems, Apr. 2002, pp. 219-226.
U.S. Appl. No. 11/237,435, Non-Final Office Action mailed May 19, 2009.
U.S. Appl. No. 11/237,435, Final Office Action mailed Dec. 2, 2009.
U.S. Appl. No. 11/237,435, Notice of Allowance mailed Jan. 12, 2010.

* cited by examiner

SYSTEM AND METHOD FOR TRANSRATING BASED ON MULTIMEDIA PROGRAM TYPE

CROSS-REFERENCE TO RELATED APPLICATION

The present application is a continuation-in-part application of U.S. patent application Ser. No. 11/237,435 filed on Sep. 28, 2005 and entitled "System and Method for Dynamic Transrating Based on Content," the entirety of which is incorporated by reference herein.

FIELD OF THE DISCLOSURE

The present disclosure relates generally to data processing and more particularly to processing multimedia information.

BACKGROUND

Current trends in multimedia content distribution are directed to the storage of multimedia content for subsequent access or distribution. Presently, many households utilize personal video recorders (PVRs), also referred to as digital video recorders (DVRs) to store multimedia content received from a terrestrial broadcast as digital data. This data then may be accessed at a later date for display or transmission to another device, such as a cell phone or a portable video player. Current multimedia storage solutions face a choice of either content quality or storage space. As such, these conventional solutions either elect to indiscriminately reduce content quality content, thereby reducing the space required to store the data, or they elect to retain content quality, thereby limiting the amount of data that may be stored in a cost-effective manner. Accordingly, an improved technique for processing multimedia data for storage or distribution would be advantageous.

BRIEF DESCRIPTION OF THE DRAWINGS

The purpose and advantages of the present disclosure will be apparent to those of ordinary skill in the art from the following detailed description in conjunction with the appended drawings in which like reference characters are used to indicate like elements, and in which.

DETAILED DESCRIPTION OF THE DISCLOSURE

The following description is intended to convey a thorough understanding of the present disclosure by providing a number of specific embodiments and details involving modifying multimedia content based on one or more rule sets associated with content characteristics. It is understood, however, that the present disclosure is not limited to these specific embodiments and details, which are exemplary only. It is further understood that one possessing ordinary skill in the art, in light of known systems and methods, would appreciate the use of the disclosure for its intended purposes and benefits in any number of alternative embodiments, depending upon specific design and other needs.

FIGS. 1-5 illustrate exemplary techniques for modifying multimedia content based on rule sets associated with one or more content characteristics. In at least one embodiment, multimedia data representing, for example, a program is received. Based on program information associated with the multimedia data, a rule template is identified. The rule template includes one or more rules, each rule being represented by, for example, a content characteristic and one or more content actions associated with the content characteristic. The rule template then is applied to the multimedia data so as to modify the multimedia data. In one embodiment, the rule template is applied by processing the multimedia data using some or all of the applicable rules of the rule template, where the multimedia content of the multimedia data is analyzed to determine if the content characteristics of one or more rules are present, and if so, one or more of the content actions associated with the identified content characteristics may be performed. In another embodiment, a multimedia program type of the received multimedia data is determined. Based on the determined multimedia program type, a peak bit rate limit and/or an average bit rate limit are determined. Further, in instances where a transrated version of the multimedia data is to be stored, a remaining storage capacity of a storage device is determined and the peak bit rate limit and/or the average bit rate limit can be adjusted based on the remaining storage capacity. The multimedia data then is transrated to generate transrated multimedia data that has a peak bit rate that does not exceed the selected peak bit rate limit and/or having an average bit rate that does not exceed the selected average bit rate limit. The transrating of the multimedia additionally can include the application of rule sets based on content characteristics. After transrating, the multimedia data can be transmitted via a network to a destination multimedia device, stored locally for subsequent use, or a combination thereof.

Figure 1:
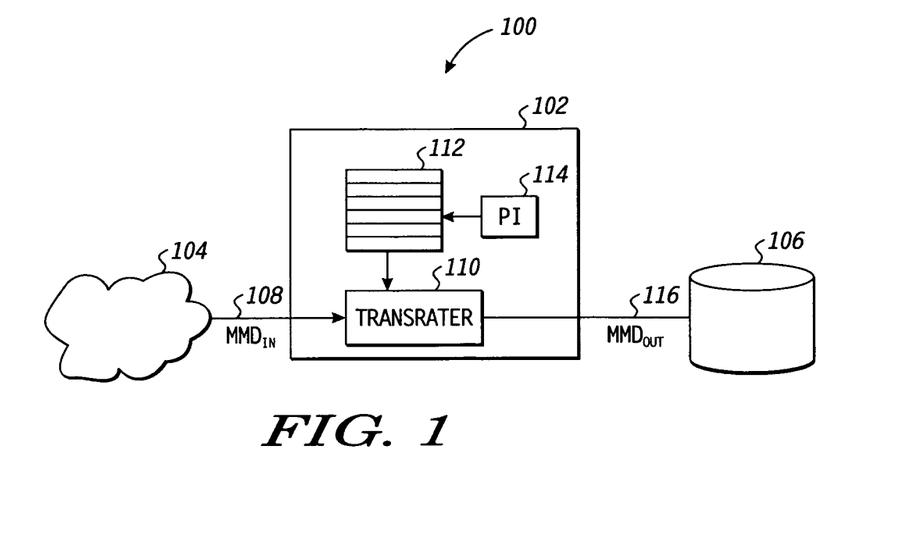
FIGS. 1 and 2 are block diagrams illustrating exemplary multimedia processing systems in accordance with at least one embodiment of the present disclosure.

Referring to FIG. 1, an exemplary multimedia processing system 100 is illustrated in accordance with at least one embodiment of the present disclosure. As exemplary depicted, the system 100 can include a multimedia processing device 102, a content provider 104 and one or more storage devices 106. The multimedia processing device 102, in one embodiment, includes a transrater 110, a rules template database, and a bit rate limit database. Implementations of the multimedia processing device 102 may include, for example, a set top box, a personal versatile recorder (PVR), a television tuner card, a video card, and the like. The content provider 104 can include, for example, a satellite video feed, a cable television head in, a digital versatile disk (DVD) drive, and the like. The storage device 106 may include, for example, memory, a hard disc, a DVD drive, and the like.

In operation, the multimedia processing device 102 receives multimedia data 108 from the content provider 104, where the multimedia data may be provide in, for example, an MPEG data stream format. Program information 114 associated with the multimedia data 108 also can be provided with the multimedia data 108 or as a separate transmission. The program information 114 provides an indication or description of the programmatic details of the multimedia data 108. To illustrate, the multimedia data 108 may represent, for example, a particular football game and the program information 114 therefore can identify the multimedia data generally as a sports program, more particularly as a football program, and more specifically as, for example, a NFL® football program for a particular television network (e.g., Monday Night Football®). The program information 114 can include electronic program guide (EPG) information or information transmitted as closed captioning information during vertical blanking intervals.

Based on the program information 114, the transrater 110 identifies a particular rules template from the rules template database 112 that is applicable to the multimedia program type of the multimedia data 114. Using the example provided above, the rules template selected may be a rules template that is applicable to sports programs in general, a rules template that is applicable to football games, or a rules template that is applicable to the particular type of football game (e.g., a college football game or a football game program provided by a particular television network). After identifying the appropriate rules template, the transrater 110 analyzes one or more portions of the content of the multimedia data 108 to determine if one or more content characteristics identified by the rules of the rules template are present in an analyzed portion. To illustrate, the rules template can include a rule that provides that if the analyzed content portion includes a change in average audio volume that is greater than a given threshold (one example of a content characteristic), then the bit rate of the content portion is reduced by a provided amount (one example of a content action). This rule may be utilized, for example, to identify the presence of a commercial (which often is preceded by a change in volume), and if so present, the bit rate of the multimedia data representing the commercial content may be reduced so as to reduce the overall amount of multimedia data without materially affecting the multimedia content of the program that a viewer is likely to care about (i.e., non-commercial content).

If the content characteristic of an applied rule is present in the analyzed portion of the multimedia content, the transrater 110 may perform one or more content actions associated with the rule with respect to the multimedia content. For example, using the change-in-volume content characteristic described above, a corresponding content action can include, for example, a reduction in the bit-rate of the multimedia data representing the commercial content. As a result, the data representing the commercial content can be reduced without materially affecting the user's enjoyment of the program because users typically do not pay as much attention to commercials as they do the remainder of the program and the commercials therefore do not need to be of the same or similar quality as the rest of the program.

The transrater 110 thus can apply the rules template to the multimedia data by analyzing the multimedia content of the data in view of some or all of the rules of the template, thereby generating modified multimedia data 116 from the received multimedia data 108. The modified multimedia data 116 then may be provided for storage in the storage device 106 for subsequent access.

In addition to, or instead of, applying a rule template to the multimedia data based on an analysis of individual content characteristics, in one embodiment, the transrater 110 can identify the multimedia program type of the program represented by the multimedia data, and based on this determined multimedia program type, select a peak bit rate limit, an average bit rate limit, or both, which are used to control the degree to which the multimedia data is transrated so that the resulting transrated multimedia data has a peak bit rate that does not exceed the identified peak bit rate limit and/or an average bit rate that does not exceed the identified average bit rate limit.

Further, it will be appreciated that the storage device 106 may have a limited capacity to store additional multimedia data due to the storage of multimedia data for other programs. Accordingly, in one embodiment, the remaining storage capacity of the storage device 106 can be determined and the selected peak bit rate limit and the selected average bit rate limit can be adjusted accordingly. In this instance, the factor by which the bit rate limits are scaled typically are relatively inversely proportional to the remaining storage capacity such that a relatively large remaining storage capacity can result in little or no decrease in (or possibly an increase in) the bit rate limits, whereas relatively little remaining storage capacity can result in a more substantial decrease in the bit rate limits. Consequently, the resulting amount of data generated by the transrating process can be modulated to accommodate the remaining storage capacity of the storage device 106.

Figure 2:
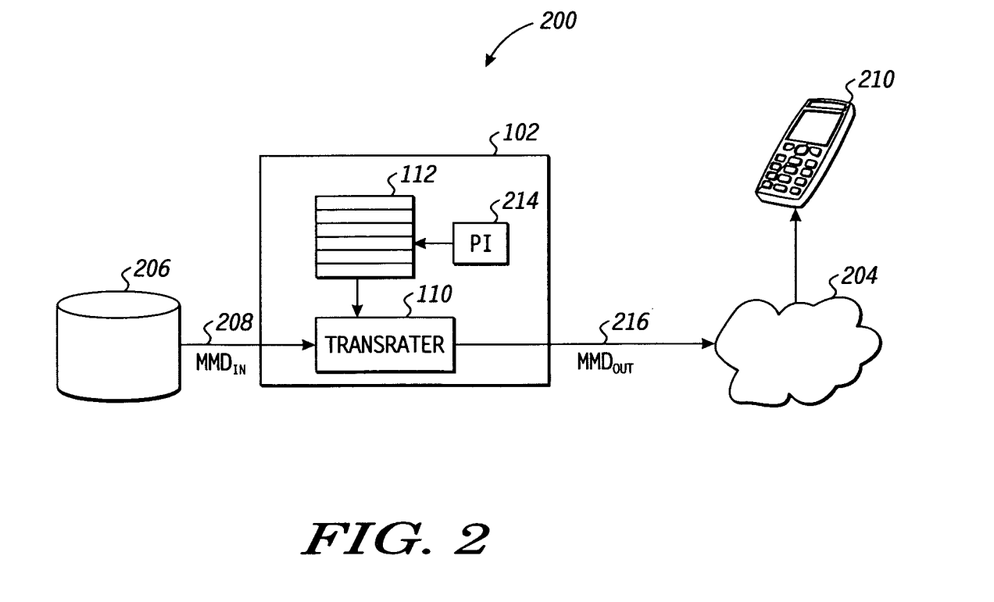

Referring to FIG. 2, another exemplary multimedia processing system 200 is illustrated in accordance with at least one embodiment of the present disclosure. As illustrated, the system 200 includes the multimedia processing device 102 having an input connected to a storage device 206 and an output connected to at least one multimedia device 210 via a network 204. In the illustrated example, the transrater 110 may access multimedia data 208 stored in the storage device 206, identify the appropriate rules template from the template database 112 using program information 214 associated with the multimedia data 208, and apply the identified template to the multimedia content of the multimedia data 208 to generate modified multimedia data 216 as described above. The transrater 110 also may determine the multimedia program type of the multimedia data 208 stored in the storage device 206, select a peak bit rate limit and/or average bit rate limit based on the multimedia program type, and incorporate the selected bit rate limits into the transrating of the multimedia data 208 (in addition to or instead of the application of the content actions identified by the content characteristics of the multimedia data 208) to generate the modified multimedia data 216 such that does not exceed the selected bit rate limits.

Further, in addition to, or instead of providing the modified multimedia data 216 for storage in a local storage device, the modified multimedia data 216 may be transmitted for storage in the multimedia device 208 via the network 204, where the network 204 may include, for example, a wireless network, the Internet, a universal serial bus (USB), and the like. Accordingly, the modified multimedia data 216 subsequently may be accessed by the multimedia device for processing for display or for transmission to another device.

It will be appreciated that data storage limitations of the multimedia device 210 and/or bandwidth limitations of the network 204 may require additional consideration when transrating the input multimedia data 208 to generate the output modified multimedia data 216 so as to comply with these limitations. Accordingly, in at least one embodiment, the template database 112 may include templates indexed not only by, for example, multimedia program type, but also by one or more characteristics of the multimedia device 210 and/or the network 204. For example, a given news program may have a plurality of different rules templates that can be applied, where some rules templates are directed to portable multimedia devices that have limited storage and other rules templates are directed to multimedia devices or storage devices that have less limited storage or higher-bandwidth network connections. Those rules template directed to portable device can have, for example, rules that have more aggressive data-reducing content actions, whereas those rule templates directed to high-capacity devices can have, for example, rules that are less aggressive with respect to data-reduction and focus more on total image quality. To illustrate, one content action can include, for example, the modification of a peak bit rate limit and/or an average bit rate limit based on the storage capacity of the device.

Table 1 below provides a non-limiting list of exemplary rules used to process the content of multimedia data.

TABLE 1

Exemplary Rule Sets

| Rule Name | Content Characteristic Description | Content Action(s) |
|---|---|---|
| Commercial Detect | Change in average volume > threshold | Insert commercial index into multimedia data<br>Reduce bit rate for duration of identified commercial content<br>Reduce resolution for duration of identified commercial content |
| Score Change | OCR analysis of portion of image representing score box indicates change in text (and therefore change in score) | Increase audio volume of content for time period encompassing the score change<br>Increase bit-rate of content for time period encompassing the score change<br>Increase resolution of content for time period encompassing the score change |
| Goal | Audio content includes the voiced word "goal" | Increase bit rate of content for time period encompassing the goal |
| Game in Play | Detect time period having a yellow line in image frame indicating line of scrimmage in football game | Increase bit rate of content for time period |
| Talking Head Box | Unconditional | Decrease bit rate for screen portion used to display news anchor |
| Stock Ticker | Unconditional | Decrease resolution for screen portion used to display stock prices |

Figure 3:
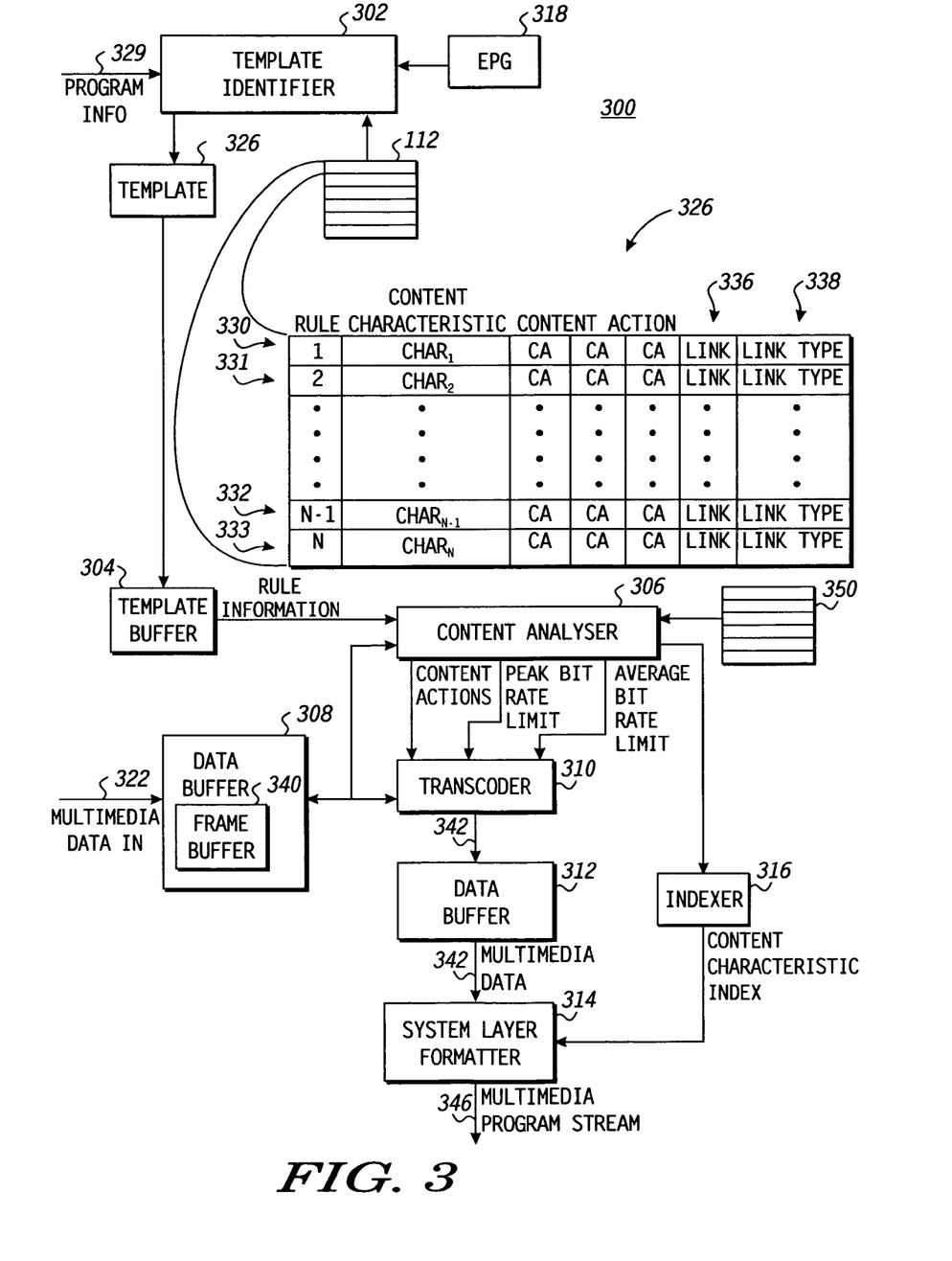
FIG. 3 is a block diagram illustrating an exemplary implementation of a transrating system in accordance with at least one embodiment of the present disclosure.

Referring to FIG. 3, an exemplary implementation of the transrater 110 of FIGS. 1 and 2 is illustrated in accordance with at least one embodiment of the present disclosure. The exemplary transrater 300 includes a rules template identifier module 302, a rules table buffer 304, a content analyzer 306, an input data buffer 308, a transcoder 310, an output data buffer 312, a system layer formatter 314 and an indexer 316.

In operation, multimedia data 322 is received and buffered in the input data buffer 308. Program information 324 associated with the input multimedia data 322 is provided to the template identifier module 302. Based on the program information 324, the template identifier module 302 indexes the rules table database 112 to identify an appropriate rules table 326 to apply to the incoming multimedia data 322. The identified rules table 326 can be provided for storage in the table buffer 304 for use by the content analyzer 306. Alternately, an indicator (e.g., an address or pointer) to the identified rules table 326 may be provided to the content analyzer 306.

In at least one embodiment, the template identifier module 302 has access to electronic programming guide (EPG) information 318 so that the template identifier module 302 may identify one or more multimedia program types of the incoming multimedia data 322 and identify the rules table 326 accordingly. In at least one embodiment, multiple rules tables may be appropriately applied to the multimedia data 322. In such instances, the template identifier module 302 can select the more appropriate template to apply to the multimedia data 322, where the more appropriate template typically is the template aligned with the most specific multimedia program type. For example, the EPG information 318 may identify the incoming multimedia data 322 as being associated with a sports program in general and a soccer game program specifically. The template identifier module 302 therefore may identify a rules template associated with soccer game programs in particular. If such template is not available, the template identifier module 302 alternatively may select a rules template associated with sports programs in general.

Moreover, in one embodiment, when no rules template is identified based on specific program information, the template identifier module 302 may select a default rules template. For example, if the multimedia data 322 represents a news broadcast from a particular television network for which there is no corresponding rules template in the template database 112, the template identifier module 302 may select a default template that may be generally associated with, for example, the type of multimedia device 210 that is expected to receive the resulting modified multimedia data.

An exemplary implementation of the rules template 326 is depicted by FIG. 3. As illustrated, some or all of the rules templates of the template database 112 may include one or more rules (e.g., rules entries 330-333, also identified as Rule 1-Rule N), each rule having a content characteristic descriptor (e.g., content characteristic descriptors $CC_1$-$CC_N$ for rule entries 330-333, respectively) and one or more content action descriptors (CA) associated with each content characteristic descriptor. The content characteristic descriptors typically represent a content characteristic which, if found in an analyzed content portion, results in the performance (or the avoidance of the performance) of one or more content actions represented by the one or more content action descriptors. The content characteristic descriptors typically include information describing a characteristic of the multimedia content (such as, for example, a descriptor indicating that if an optical character recognition analysis of the top portion of successive frames indicates that the score of a game has changed). The content characteristic descriptors may include, for example, microcode, a pointer to a memory location storing a routine for performing the one or more content actions, or information used in processing the multimedia data (such as, for example, a quantization scaling factor or a resolution scaling factor to be applied by the transcoder 310).

Each rule further may include a link field 336 to indicate if the rule is linked to any other links and a link type field 338 to indicate the type of link (e.g., an AND relationship or an OR relationship). For example, Rule 1 may be linked to Rule 2 in an AND relationship whereby if the content characteristic of Rule 1 is found the content characteristic of Rule 2 also must be found before the content actions of Rule 1 can be performed. As another example, Rule 1 may be linked to Rule 2 in an OR relationship whereby if the content characteristic of Rule 1 is identified as present in the analyzed content portion, Rule 2 is not to be applied to the content portion.

Although the exemplary rules described above have a condition (the presence of the content characteristic) before the corresponding one or more content actions can be performed, in at least one embodiment one or more of the rules may be unconditional rules whose content action(s) are always performed without a corresponding condition being met. For example, for multimedia content representing a new program, the image portion of successive frames that represents, for example, a stock ticker can be transrated so as to automatically reduce the image portion's resolution with an analysis of the content of the image portion.

In instances wherein a peak bit rate limit and/or an average bit rate limit is to be applied to the transrating of multimedia data based on multimedia program type, the corresponding bit rate limits can be represented as a rule of the rules template 336, whereby the content action can represent, for example, a command to control the transrating of the multimedia data such that it does not exceed the identified bit rate limits. In another embodiment, the bit rate limits are accessed via a bit rate limit table 350 accessible by, for example, the content analyzer 306 or the template identifier 302.

The content analyzer 306, in one embodiment, analyzes the multimedia content of the multimedia data 322 in view of some or all of the rules of the rule template 326. Accordingly, in one embodiment, the content analyzer 306 obtains rule information from the table buffer 304 (or, alternatively, from the template database 112 directly) and analyzes the content of the multimedia data 322 to determine if content characteristics associated with the applied rules are present in one or more portions of the multimedia content.

In some instances, the content analyzer 306 can analyze the multimedia data 322 for certain content characteristics while the multimedia data 322 is in encoded form. To illustrate, an exemplary content characteristic to be identified can be an amount of motion between successive frames that is greater than a certain threshold. In this case, the content analyzer 306 may analyze, for example, the motion vector information of the encoded multimedia data 322 to determine if there is substantial motion between image frames. However, in other instances, identifying certain content characteristics can require that the multimedia data 322 be in decoded form. For example, in one embodiment the content characteristic may be the identification of the word "goal" in the audio content of the multimedia data 322. In this case, the content analyzer 306 typically would access decoded audio information to perform an audio analysis for the word "goal". Accordingly, the transcoder 310 may decode some or all of the multimedia data 322 and store the decoded multimedia data in a frame buffer 340 (exemplary illustrated as part of the data buffer 308). The content analyzer 306 then may access the decoded multimedia data in the frame buffer 340 to perform the content analysis.

The portion of the content of the multimedia data 322 analyzed for any particular content characteristic typically is dependent on the particular characteristic. To illustrate, the content characteristic of a change in displayed text representing, for example, a score or a stock value may be identified by an OCR analysis of a certain segment of two successive image frames. Thus, the content portion for this characteristic would be two or more frames. As another example, the content characteristic may be the presence of a yellow line indicating the line of scrimmage in a football game. In this instance, the yellow line may be detected by analyzing a particular portion of a single image frame (e.g., the center column of an image frame). In this case, the analyzed content portion can include the center column of the image frame.

In the event that the content analyzer 306 detects that a content characteristic of a rule is present in an analyzed portion of the multimedia data 322, the content analyzer 306 provides the transcoder 310 an indication of the one or more content actions to be performed. The transcoder 310 then processes some or all of the multimedia data 322 in accordance with the content actions to generate modified multimedia data 342. The multimedia data 342 then may be stored in the outgoing data buffer 312 before it is formatted for transmission as, for example, an MPEG program stream 346 by the system layer formatter 314.

In at least one embodiment, a content action to be performed includes embedding a content characteristic index in the modified multimedia data 342, where the content characteristic index identifies the corresponding portion of multimedia data 342 as representing multimedia content having the indicated content characteristic. For example, the content analyzer 306 may analyze the audio content of the multimedia data 322 to identify rapid increases in the average volume of the audio. In the event that such an average volume increase is found, the corresponding content action can include inserting a content characteristic that identifies the multimedia data portion representing, for example, the next thirty seconds of content as a commercial. Thus, the multimedia data 342 subsequently can be rapidly searched to identify the data associated with commercial content and this content may be filtered by, for example, removing the commercial content, reducing the audio volume of the commercial content, reducing the resolution and/or bit rate of the commercial content, and the like. Alternately, the content action can include the creation of a separate index table to a location of the commercial content.

Accordingly, upon identifying a content characteristic present in a portion of the multimedia content that has a corresponding content index action, the content analyzer 306 may provide index information to the indexer 316 which then manages the insertion of the appropriate content characteristic index into the multimedia data 341 using, for example, the system layer formatter 314.

In instances whereby multimedia program type-based bit rate limits are to be applied to the transrating process, the content analyzer 306 determines the multimedia program type of the program represented by the multimedia to be transrated. In one embodiment, the template identifier 302 determines the multimedia program type based on program information (e.g., EPG information 318) and provides an indication of the multimedia program type to the content analyzer 306. In another embodiment, the content analyzer 306 analyzes the multimedia content of the multimedia data to determine the multimedia program type. The content analyzer 306 can determine that a portion or all of the multimedia content has a set of one or more content characteristics associated with a particular multimedia program type. To illustrate, a football multimedia program type may be characterized by significant motion in a certain region of a sequence of images (e.g., the center of the screen where the athletes are moving) while the remaining region of the sequence of images is relatively still (e.g., the field pitch surrounding the athletes). Thus, the content analyzer 306 may identify a program as a football multimedia program type based on significant movement in the middle of the screen and little movement in the surrounding areas. As another example, a drama program may be characterized by relatively little motion and brief bursts of loud voices. Thus, the content analyzer 306 may identify a program as a drama multimedia program type based on a motion analysis that reveals little motion and an audio analysis that detects brief periods of loud human voices.

After determining the multimedia program type, the content analyzer 306 can use the multimedia program type as an index to the bit rate limit table 350 to determine a corresponding peak bit rate limit and/or an average bit rate limit to which the transrating of the multimedia is to be constrained. Table 2 represents a non-limiting example of the bit rate limit table 350.

TABLE 2

Bit Rate Limits

| Multimedia program type | Average Bit Rate Limit | Peak Bit Rate Limit |
|---|---|---|
| Drama | 6 Mbps | 12 Mpbs |
| Baseball | 8 Mbps | 12 Mpbs |
| Nature | 10 Mbps | 20 Mpbs |
| Golf | 4 Mpbs | 8 Mpbs |

Further, as discussed above, the bit rate limits can be scaled based on remaining storage capacity of a local storage device (or, alternately, of a remote storage device, such as the hard disk of a multimedia device that receives the transrated data). In the event that the remaining storage capacity falls below a certain limit, rather than scaling the bit rate limits, in one embodiment, a default minimum bit rate limits can be used in place of multimedia program type-based bit rate limits. Table 3 illustrates an exemplary, non-limiting example of a table of scaling factors to be applied to one or both of the selected peak bit rate limit and the selected average bit rate limit.

TABLE 3

Storage Capacity-Based Scaling Factors

| Remaining Storage Capacity | Scaling Factor |
|---|---|
| >5 GB | 1.0 |
| 2 GB-5 GB | 0.8 |
| 1 GB-5 GB | 0.7 |
| <1 GB | 0.5 |

After identifying and scaling the bit rate limits, the content analyzer 306 provides indicators of the peak bit rate limit and/or the average bit rate limit to the transcoder 310 so as to configure the transcoder 310 so that the supplied bit rate limits are not exceeded by the modified media data 342. In one embodiment, the transcoder 310 monitors the cumulative bit rate so as to maintain the average bit rate. Normally, there are equally distributed slow motion or low complexity frames versus high motion or complexity frames during transcoding. With minimal visual quality loss, the slow/low complexity frames can be transcoded at a higher quantization parameter resulting in a higher bits allocation savings. The resulting bits savings compensate for the transcoding of the higher motion and complexity frames at a higher visual quality. However, in instances where there are too few slow or low complexity frames, a more severe approach is used to maintain the average bit rate. After the bits difference exceeds a tolerable level, the transcoder transrates future frames at a higher quantized value to reduce the cumulative bits count until a tolerable level is reached. The bits difference is the difference between the actual transcoded bits count versus the expected bit counts based on the average bit rate over transcoding period.

Figure 4:
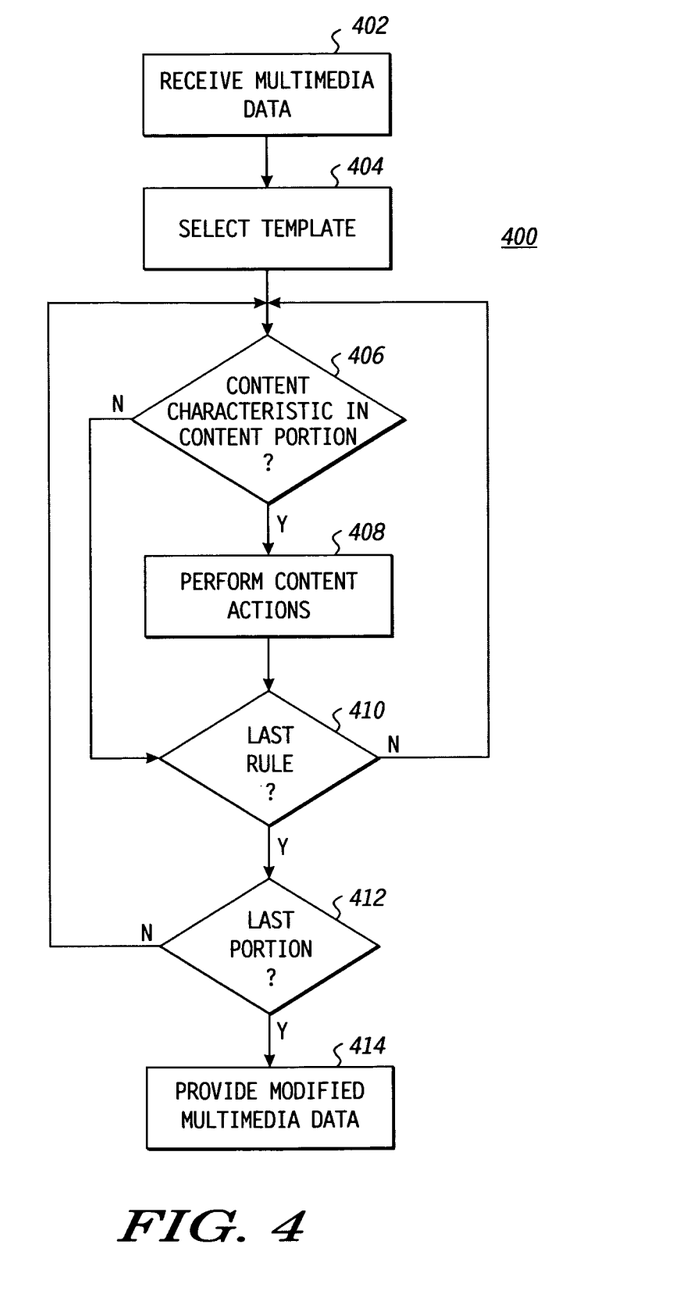
FIG. 4 is a flow diagram illustrating an exemplary method for dynamic transrating in accordance with at least one embodiment of the present disclosure.

Referring to FIG. 4, an exemplary dynamic transrating method 400 is illustrated in accordance with at least one embodiment of the present disclosure. The method 400 initiates at step 402 whereby multimedia data is received and temporarily buffered. At step 404, the appropriate rules template for the multimedia data is selected based on program information, such as, for example, multimedia program type, associated with the multimedia data. As noted above, there can be a number of rules templates appropriate for application to the multimedia data. In such instances, the rules template more aligned with the program characteristics (e.g., a rules template specifically for a football game rather than a general sports program template) is selected. In the event that a specific rules template is not available or appropriate, in one embodiment a default general rules template may be selected.

At step 406, a rule from the selected rules template is accessed and a portion of the content of the multimedia data is analyzed to determine whether the content characteristic associated with the rule is present in the analyzed content portion. If the content characteristic is not present in the analyzed content portion, the method 400 continues to step 410. Otherwise, when the content characteristic is present, one or more of the content actions associated with the rule are performed at step 408. In one embodiment, rules may be linked using logical operations such as AND operations and/or OR operations. Accordingly, if so linked, the content actions of the rule may not be performed at step 408 until the conditions of other linked rules are confirmed.

At step 410 the rules template is checked to determine if the last rule to be applied has been applied. If not, the method 400 repeats steps 406-410 for the next rule to be applied. If it is determined at step 412 that content portions of the multimedia data have yet to be analyzed, the method 400 repeats steps 406-410 to apply the appropriate rules to the next multimedia content portion to be analyzed.

At step 414 the resulting modified multimedia data is provided for storage in a storage device, such as a hard disc or a DVD disc, or provided for transmission to one or more multimedia devices, such as a cellular phone or PDA, via a network. As a result, the original multimedia data may be modified so as to reduce its size while retaining suitable content quality.

Figure 5:
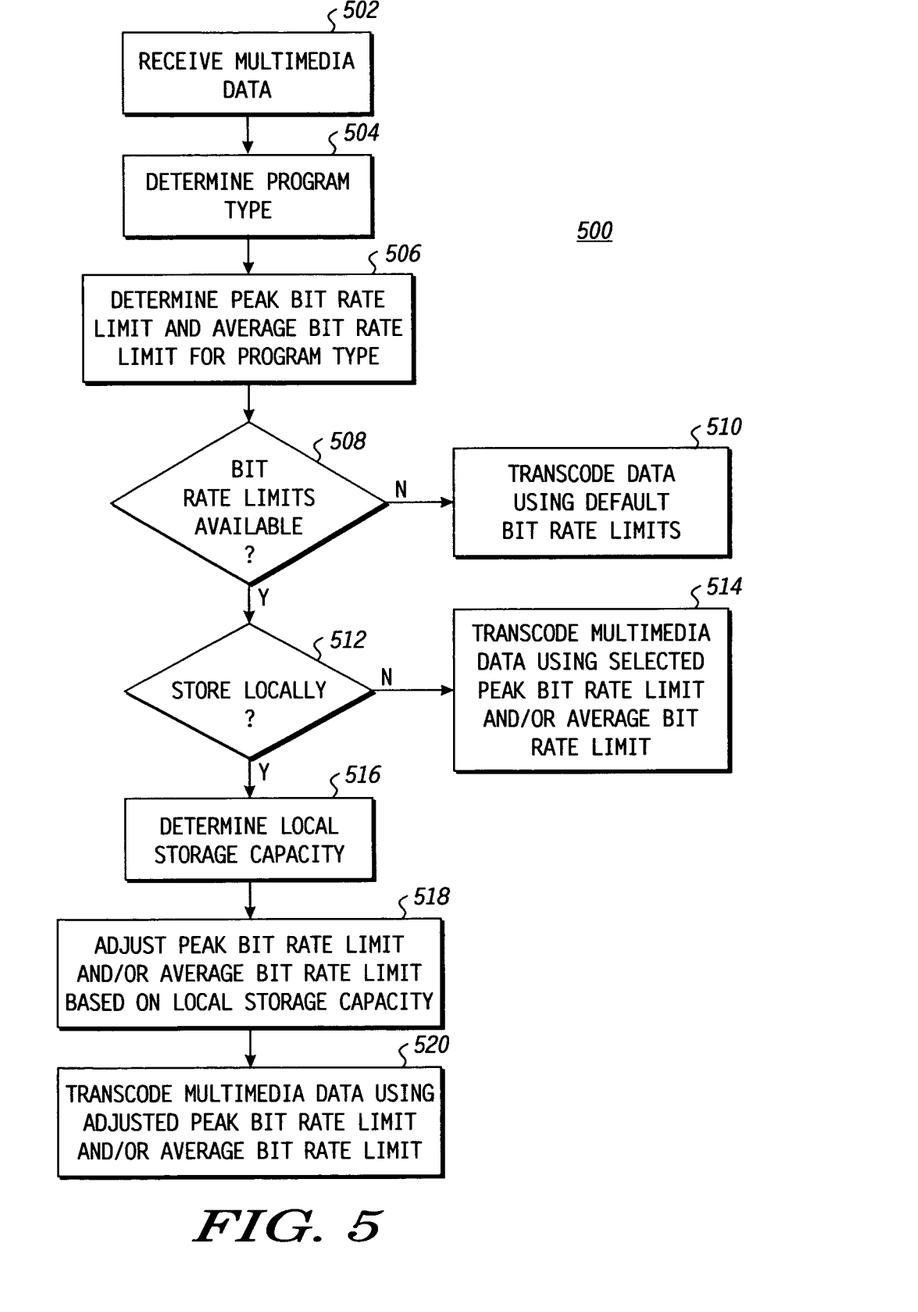
FIG. 5 is a flow diagram illustrating an exemplary method for transrating based on multimedia program type in accordance with at least one embodiment of the present disclosure.

Referring to FIG. 5, an exemplary method 500 for transrating multimedia data based on multimedia program type-based bit rate limits is illustrated in accordance with at least one embodiment of the present disclosure. The method 500 initiates at block 502 wherein multimedia data is received at and temporarily buffered at a transrating system, such as a video provider.

At block 504, the multimedia program type of a program represented by the multimedia data is determined. As discussed above, the multimedia program type can be determined based on program information, such as EPG information, received in conjunction with the multimedia data. Alternately, the multimedia program type can be determined based on an analysis or comparison of one or more content characteristics of portions of the entire multimedia content of the multimedia data.

At block 506, a peak bit rate limit and/or an average bit rate limit is determined based on the multimedia program type of the multimedia data. In one embodiment, the transrating system implements a bit rate limit table that indexes bit rate limits by multimedia program type, and determining the bit rate limits comprises indexing the table based on the multimedia program type. In the event that it is determined that no specific bit rate limits are applicable to the determined multimedia program type at block 508, or if a multimedia program type cannot be determined, the method 500 flows to block 510, whereby the multimedia data is transrated in accordance with a default peak bit rate limit and/or a default average bit rate limit so as to generate modified multimedia data. The modified multimedia data then can be stored to a local storage device, transmitted to one or more multimedia devices (e.g., via a wireless transmission), or a combination thereof.

In the event that multimedia program type-specific bit rate limits are determined, at decision block 512 the method 500 includes determining whether the transrated version of the multimedia data is to be stored locally. If the resulting data is to be transmitted without local storage, the multimedia data is transrated in compliance with one or both of the multimedia program type-specific bit rate limits so as to generate a modified multimedia data that does not exceed the specified bit rate limits. The modified multimedia data is then provided for transmission to one or more multimedia devices.

In the event that the resulting multimedia data is to be locally stored, the method 500 includes determining a remaining storage capacity of the local storage device(s) at block 516. The remaining storage capacity can be represented in absolute terms, such as the number of megabytes (MBs) or gigabytes (GB) available at the local storage device, or the remaining storage capacity can be represented in relative terms, such as a percentage of the total storage capacity still available (e.g., a 20% remaining storage capacity). At block 518, the multimedia program type-specific bit rate limits are adjusted based on the determined remaining storage capacity. In one embodiment, the bit rate limits are scaled based on a scaling factor that corresponds to the remaining storage capacity or a remaining storage capacity range. The scaling factors can be arranged so that the lower the remaining storage capacity, the greater the reduction to the bit rate limits.

At block 520, the multimedia data is transrated in accordance with one or both of the modified bit rate limits so as to generate modified multimedia data having a peak bit rate not greater than the adjusted peak bit rate limit and/or having an average bit rate not greater than the adjusted average bit rate limit. The modified multimedia data is provided for local storage at the local storage device, transmitted to one or more multimedia devices, or a combination thereof.

Other embodiments, uses, and advantages of the present disclosure will be apparent to those skilled in the art from consideration of the specification and practice of the disclosure disclosed herein. The specification and drawings should be considered exemplary only, and the scope of the disclosure is accordingly intended to be limited only by the following claims and equivalents thereof.

What is claimed is:

1. A method comprising:
   determining a multimedia program type of a first multimedia data representative of a multimedia program;
   determining a remaining storage capacity of a storage device;
   determining a peak bit rate limit based on the multimedia program type and the remaining storage capacity;
   determining an average bit rate limit based on the multimedia program type, the average bit rate limit being different than the peak bit rate limit; and
   transrating the first multimedia data to generate a second multimedia data having a peak bit rate not greater than the peak bit rate limit and an average bit rate not greater than the average bit rate limit.

2. The method of claim 1,
   wherein determining the average bit rate limit comprises determining the average bit rate limit based on the multimedia program type and the remaining storage capacity.

3. The method of claim 1, further comprising:
   storing the second multimedia data at the storage device.

4. The method of claim 1, further comprising:
   receiving program information associated with the first multimedia data; and
   wherein determining the multimedia program type of the first multimedia data comprises determining the multimedia program type based on the program information.

5. The method of claim 4, wherein the program information comprises electronic programming guide information.

6. The method of claim 1, wherein determining the multimedia program type of the first multimedia data comprises determining the multimedia program type based on whether a multimedia content represented by the first multimedia data comprises a content characteristic associated with the multimedia program type.

7. The method of claim 1, wherein determining the peak bit rate limit comprises selecting the peak bit rate limit from a plurality of peak bit rate limits based on the multimedia program type and the remaining storage capacity.

8. The method of claim 1, further comprising:
   transmitting the second multimedia data via a network for reception by a multimedia device.

9. The method of claim 8, wherein transmitting the second multimedia data comprises wirelessly transmitting the second multimedia data.

10. A system comprising:
    a storage device;
    an interface to receive multimedia data representative of a multimedia program;
    a content analyzer operably coupled to the interface and configured to:
        determine a multimedia program type of the multimedia program;
        determine a remaining storage capacity of the storage device;
        determine a peak bit rate limit based on the multimedia program type and the remaining storage capacity; and
        determine an average bit rate limit based on the multimedia program type, the average bit rate limit being different than the peak bit rate limit; and
    a transcoder operably coupled to the interface and the content analyzer, the transcoder configured to transrate the multimedia data to generate transrated multimedia data having a peak bit rate not greater than the peak bit rate limit and having an average bit rate not greater than the average bit rate limit.

11. The system of claim 10, wherein the transcoder further is configured to provide the transrated multimedia data for storage at the storage device.

12. The system of claim 10, wherein the content analyzer is configured to:
    determine the average bit rate limit based on the multimedia program type and the remaining storage capacity.

13. The system of claim 10, wherein the content analyzer is configured to determine the multimedia program type based on program information received in association with the multimedia data.

14. The system of claim 13, wherein the program information includes electronic programming guide information.

15. The system of claim 10, wherein the content analyzer is configured to determine the multimedia program type based on whether a multimedia content represented by the first multimedia data comprises a content characteristic associated with the multimedia program type.

16. The system of claim 10, wherein the content analyzer is configured to select the peak bit rate limit from a plurality of peak bit rate limits based on the multimedia program type and the remaining storage capacity.

17. The system of claim 10, further comprising:
    a second interface configured to transmit the transrated multimedia data via a network for reception by a multimedia device.

18. The system of claim 17, wherein the second interface comprises a wireless interface.

19. A system comprising:
a storage device;
an interface to receive multimedia data representative of a multimedia program;
a content analyzer operably coupled to the interface and configured to:
  determine a multimedia program type of the multimedia program; and
  determine a peak bit rate limit and an average bit rate limit based on the multimedia program type, the average bit rate limit being different than the peak bit rate limit; and
a transcoder operably coupled to the interface and the content analyzer, the transcoder configured to transrate the multimedia data to generate transrated multimedia data having a peak bit rate not greater than the peak bit rate limit and having an average bit rate not greater than the average bit rate limit.

20. The system of claim 19, further comprising:
a second interface configured to transmit the transrated multimedia data via a network for reception by a multimedia device.

21. The system of claim 19, wherein the content analyzer is configured to determine the multimedia program type based on whether a multimedia content represented by the multimedia data comprises a content characteristic associated with the multimedia program type.

* * * * *